Patented June 30, 1953

2,643,953

UNITED STATES PATENT OFFICE 2,643,953

PROCESS OF MAKING ADHESIVE FROM LIGNOCELLULOSE

William Schoen, Laurel, Miss., assignor to Masonite Corporation, Laurel, Miss., a corporation of Delaware No Drawing. Application July 1, 1949, Serial No. 102,715

8 Claims. (Cl. 106—163)

This invention relates to a process of preparing an improved adhesive, and more particularly to a process of preparing a water-soluble adhesive from lignocellulose materials.

In U. S. Patent 2,224,135, issued to Robert M. Boehm December 10, 1940, lignocellulose materials are fiberized by hydrolyzing under high temperature and pressure in the presence of moisture, water solubles are removed from the hydrolyzed fiber, the fiber then is used in making boards and the water solubles are used in making by-products such as aldehydes, alcohols and organic acids. The patent also states that the water solubles, thus obtained or further concentrated by evaporation of water, may be used as an adhesive.

These water solubles reduced to a powdery state, as by evaporation of water, are known in the trade as "Masonoid" and will be referred to hereinafter as such. The terms "water solubles" and "water-soluble reaction product" as used herein include the materials dispersed or suspended in the water as well as the materials dissolved in the water.

While these water solubles have adhesive properties, it has been found that they are not entirely satisfactory. They are undesirably hygroscopic and therefore the bond formed in adhesive application is somewhat unstable. Under high humidity conditions the adhesive bond takes up moisture from the air and weakens, whereas under low humidity conditions the adhesive bond loses moisture and weakens. Upon taking up moisture, the adhesive bond tends to liquefy, and upon losing moisture it tends to harden and approach a brittle state.

From the standpoint of storage and handling and shipping, it is desirable to concentrate the water solubles to a powder by drying and then redissolve the powder in water at the place of use. However, this has been found to be difficult because the powder is apt to cake and crust even when stored in closed containers. If left more freely exposed to the air, this tendency is increased so that the powder may cake to an advanced stage and become gummy.

An object of this invention is to provide a process of preparing an improved adhesive. A further object is to provide a process of preparing a water-soluble adhesive from lignocellulose materials. A still further object is to provide a process of preparing a water-soluble adhesive from lignocellulose materials in which the disadvantages of the prior art are substantially overcome. Other objects will be apparent from the description of this invention given hereinafter.

The above objects are accomplished according to the present invention by hydrolyzing lignocellulose materials under high temperature and pressure (i. e. elevated or above atmospheric) in the presence of moisture; recovering the water-soluble extract and concentrating the extract substantially to dryness (dry product called "Masonoid" by removing water therefrom; slurrying the dry reaction product with methanol and removing the methanol from the slurry; washing the residue with a substantially anhydrous solvent having a boiling point within the range of about 25° C.–100° C. and selected from the group consisting of ethers of the monohydroxy aliphatic alcohols, aliphatic ketones, esters of aliphatic acids, aliphatic hydrocarbons and their halogen derivatives; removing said solvent from said residue; then drying the residue.

In carrying out this invention according to a preferred embodiment thereof, "Masonoid" is slurried with warm methanol (about 50° C.) by adding the "Masonoid" to methanol while agitating mildly. The resulting mixture is filtered under vacuum until only a shallow layer of methanol remains above the "Masonoid" filter cake. The cake is slurried with a warm solvent and filtered, the solvent being a low boiling point (about 25° C.–100° C.) anhydrous solvent in which methanol is readily soluble and in which the methanol-treated "Masonoid" is substantially insoluble. Then the resulting cake is spread out in thin layers and dried in a vacuum oven at a temperature of about 30° C.–130° C. depending on the solvent used.

The purpose of the solvent wash is to remove the last traces of methanol from the "Masonoid". Attempts to eliminate this wash-solvent treatment by mechanically removing the last traces of methanol, as e. g. by filtration or evaporation, causes the "Masonoid" to cake and gum severely, and thus defeats the objects of this invention. It is for this reason that care is exercised in removing the methanol from the "Masonoid"-methanol slurry so as not to completely free the "Masonoid" filter cake of methanol before treatment with wash solvent.

The following examples, wherein parts are by weight unless otherwise indicated, illustrate specific embodiments of this invention. While the procedure disclosed hereinbefore and in Example IV hereinafter is the preferred method of carrying out this invention, the methods of Examples I, II, III and V may be used also to substantial advantage.

The "Masonoid" used in these examples was obtained by the conventional method of hydrolyzing wood chips under pressure in the presence of steam, recovering the water solubles therefrom and drying same.

*Example I*

50 parts "Masonoid" was added gradually to 118.8 parts methanol while agitating mildly until a uniform slurry was obtained. The slurry was vacuum filtered, leaving a shallow layer of methanol above the "Masonoid" filter cake. This "Masonoid" was subjected to a total of three such methanol treatments. The vacuum was discontinued and the cake slurried with 396 parts anhydrous acetone. The vacuum was reapplied and the caked sucked practically dry. The final residue was spread out on trays and dried in a vacuum oven at 50° C. for 2 hours. A yield of 60% improved "Masonoid" was obtained, based on the weight of the original untreated "Masonoid."

To compare the adhesive properties of the improved "Masonoid" thus obtained with untreated "Masonoid," a 60% water solution was prepared of each. Drying tests were run by applying thin films of each to glass slides and noting the drying time at room conditions. The untreated "Masonoid" dried in 18 minutes, whereas the treated "Masonoid" dried in 11 minutes. Bonding tests were made by applying thin films of each adhesive solution to strips of cardboard and noting the time, at room conditions, required to obtain a bond stronger than the cardboard. With untreated "Masonoid" 32 minutes was required to form this bond, while with treated "Masonoid" only 15 minutes was required.

In another series of tests the "Masonoid" obtained according to the process of this example and untreated "Masonoid" were allowed to come to equilibrium over a period of 2 weeks in a desiccator maintained at zero per cent relative humidity. Then 5 gram samples of each were placed in 1¾" diameter glass containers and in turn placed in two lots of desiccators maintained at 70.4% and 88.8% relative humidity, respectively. The samples were examined at 24-192 hours at intervals of 24 hours for consistency and moisture change. All the samples of "Masonoid" prepared according to this example maintained their powdery consistency throughout the entire test period, whereas the untreated "Masonoid" caked after 96 hours at 70.4% relative humidity. After 48 hours at 88.8% relative humidity the untreated "Masonoid" reached an advanced stage of caking and became gummy.

*Example II*

10 parts "Masonoid" was added gradually to 31.68 parts methanol while agitating mildly until a uniform slurry was obtained. The slurry was vacuum filtered, leaving a shallow layer of methanol above the "Masonoid" filter cake. This "Masonoid" was subjected to a total of three such methanol treatments. The vacuum was discontinued and the cake slurried with 71.3 parts anhydrous ethyl ether. The vacuum was reapplied and the cake sucked practically dry. The final residue was spread out on trays and dried in a vacuum oven at 50° C. for 1.5 hours. A yield of 55.1% improved "Masonoid" was obtained, based on the weight of the original untreated "Masonoid."

*Example III*

The same procedure was used as in Example II, except that the "Masonoid" was subjected to only one treatment with methanol and except that the methanol-treated "Masonoid" was slurried with a larger amount (106.95 parts) of anhydrous ethyl ether. A yield of 70.2% improved "Masonoid" was obtained, based on the weight of the original untreated "Masonoid."

*Example IV*

100 parts "Masonoid" was added gradually to 316.8 parts methanol at 50° C. while agitating mildly until a uniform slurry was obtained. The slurry was vacuum filtered, leaving a shallow layer of methanol above the "Masonoid" filter cake. The vacuum was discontinued and the cake slurried with 158.4 parts acetone at 40° C. The vacuum was reapplied and the cake sucked practically dry. The final residue was spread out on trays and dried in a vacuum oven at 50° C. A yield of 65.08% improved "Masonoid" was obtained, based on the weight of the original untreated "Masonoid."

*Example V*

50 parts "Masonoid" was added gradually to 158.4 parts methanol at 50° C. while agitating mildly until a uniform slurry was obtained. The slurry was added to a centrifuge which was spinning at about 1500 R. P. M. Immediately after the last of the slurry was added, 158.4 parts acetone at 40° C. was added. After substantially all of the liquid acetone was discharged from the centrifuge, its speed was increased to 3600 R. P. M. and maintained about two minutes. Then the product was removed from the centrifuge, spread out on trays and dried in a vacuum oven at 50° C. A yield of 66.55% improved "Masonoid" was obtained, based on the weight of the original untreated "Masonoid."

Several materials in addition to methanol, including other members of the group of the lower aliphatic saturated alcohols, were tried under the conditions of this invention without success for treating the "Masonoid." Thus, the beneficial treatment of "Masonoid" according to this invention has been found to be peculiar to methanol.

This invention was carried out by treating the "Masonoid" with cold methanol (i. e. at room temperature) followed by filtering and washing with cold wash solvent; variations were made in the number of treatments with methanol and in the ratio of the methanol to "Masonoid" (Examples I–III). The invention was carried out also by treating the "Masonoid" with warm methanol and warm wash solvent, following each step by filtering in one case and centrifuging in the other case (Examples IV and V).

Although a substantially improved "Masonoid" resulted in each of the above procedures, the degree of improvement varied somewhat depending on the particular procedure employed. The material difference is in treating with warm versus cold methanol and wash solvent. The use of warm methanol increases its action on the "Masonoid" to the extent that one treatment with warm methanol (about 50° C.) is equivalent to three treatments with cold methanol, using the same ratio of methanol to "Masonoid" in each of the four treatments. Thus, the preference of using warm methanol is clear.

While cold methanol and cold wash solvents may be used, in such event more care is required to avoid gumming of the "Masonoid" due to condensation of atmospheric moisture as a result of evaporation of the methanol and wash solvent. This is particularly true while removing the methanol or wash solvent from the "Masonoid." This is an additional reason for preferring to use warm methanol and the prime reason for preferring to use warm wash solvents. Temperatures of the methanol and wash solvents used may be up to and including the boiling point thereof. Excellent results were obtained at the temperatures given in the examples.

There is substantially no difference in filtering and centrifuging, from the standpoint of the product obtained. Filtering is somewhat easier to control from an operational standpoint.

Best results were obtained with a ratio by weight of approximately three parts methanol to one part "Masonoid." In forming the "Masonoid"-methanol slurry, it should be remembered that violent agitation may entrap air and cause the "Masonoid" to gum.

The drying step can be carried out conventionally. The conditions are not critical within broad limits, as pointed out below. Economy is the main factor to be considered in selecting the minimum temperature to be employed. On this basis, e. g. when ethyl ether is the wash solvent used, the drying temperature should not be much less than about 30° C. The treated "Masonoid" can be dried at room conditions if such low boiling point solvents as ethyl ether are used, but it is less economical to do so. The temperature at which the "Masonoid" begins to decompose is the main factor to be considered in selecting the maximum temperature to be employed. Any temperature up to about 130° C. is safe from this standpoint. The time required to dry varies inversely with the temperature used. Very good results were obtained by drying under the conditions set forth in the examples.

In determining suitable wash solvents the important points kept in mind were good solubility for methanol, substantial nonsolubility for the methanol-treated "Masonoid," and low boiling point (about 25° C.–100° C.). The wash solvent should be substantially anhydrous, because the "Masonoid" is very soluble in water.

Suitable wash solvents include ethers of the monohydroxy aliphatic alcohols, e. g. ethyl ether, methyl propyl ether, methyl n-butyl ether, ethyl propyl ether, propyl ether, isopropyl ether, methylol (dimethoxy methane); aliphatic ketones, e. g. acetone, methyl ethyl ketone, methyl isopropyl ketone, diethyl ketone, and methyl n-propyl ketone; esters of aliphatic acids, e. g. methyl formate, ethyl formate, n-propyl formate, methyl acetate, ethyl acetate and methyl propinate; aliphatic hydrocarbons and their halogen derivatives, e. g. petroleum ether, hexane, pentane, dimethyl ethyl pentane, heptane, methylene chloride, ethylene chloride and ethyl bromide; and the like.

Of these solvents the ethers and ketones are preferred, ethyl ether and acetone being specifically preferred. This preference is based on the factors that these solvents are economical, readily available, common, and work exceptionally well in this invention.

As many apparently widely different embodiments of this invention may be made without departing from the spirit and scope thereof, it is to be understood that the invention is not limited to the specific embodiments thereof except as defined in the appended claims.

I claim:

1. A process of preparing an improved non-caking water-soluble adhesive mixture comprising hydrolyzing lignocellulose materials under high temperature and pressure in the presence of moisture; recovering the water-soluble extract, concentrating said extract substantially to dryness by removing water therefrom, forming a slurry of said reaction product with methanol, removing by mechanical manipulation substantially all of the methanol from the resulting slurry, washing the residue with a substantially anhydrous aliphatic solvent containing no other element than carbon, hydrogen, oxygen, and a halogen and having a boiling point within the range of about 25° C.–100° C., removing the wash solvent from said residue; and finally drying the resulting residue.

2. A process as set forth in claim 1, in which said solvent consists of an aliphatic ether of a monohydroxy aliphatic alcohol.

3. A process as set forth in claim 2, in which said solvent is ethyl ether.

4. A process as set forth in claim 1, in which said solvent consists of an aliphatic ketone.

5. A process as set forth in claim 4 in which said solvent is acetone.

6. A process as set forth in claim 1, in which the ratio of methanol to said reaction product is at least three to one parts by weight.

7. A process as set forth in claim 1, in which the temperature of the methanol and said solvent as used are above room temperature to the boiling points thereof, inclusive.

8. A process of preparing an improved non-caking water-soluble adhesive mixture comprising hydrolyzing lignocellulose materials under high temperature and pressure in the presence of moisture, recovering the water-soluble extract, concentrating said extract substantially to dryness by removing water therefrom; forming a slurry of said reaction product with methanol at a temperature of about 50° C. and in the weight ratio of about three parts methanol to one part of said reaction product, filtering the resulting slurry; forming a slurry of the residue with substantially anhydrous acetone at a temperature of about 40° C., filtering the resulting slurry, and finally drying the resulting residue at a temperature of about 50° C.

WILLIAM SCHOEN.

References Cited in the file of this patent

UNITED STATES PATENTS

| Number | Name | Date |
|---|---|---|
| 2,190,909 | Phillips | Feb. 20, 1940 |
| 2,224,135 | Boehm | Dec. 10, 1940 |
| 2,247,207 | Schorger | June 24, 1941 |

OTHER REFERENCES

Boehm, Paper Trade Journal, v. 118, No. 13, March 30, 1944, pages 35 to 38, Tappi Section, pages 109–112.